Oct. 29, 1929.   J. M. SMITH   1,733,320
DEVICE FOR DIMENSIONALLY GAUGING OBJECTS
Filed June 2, 1928
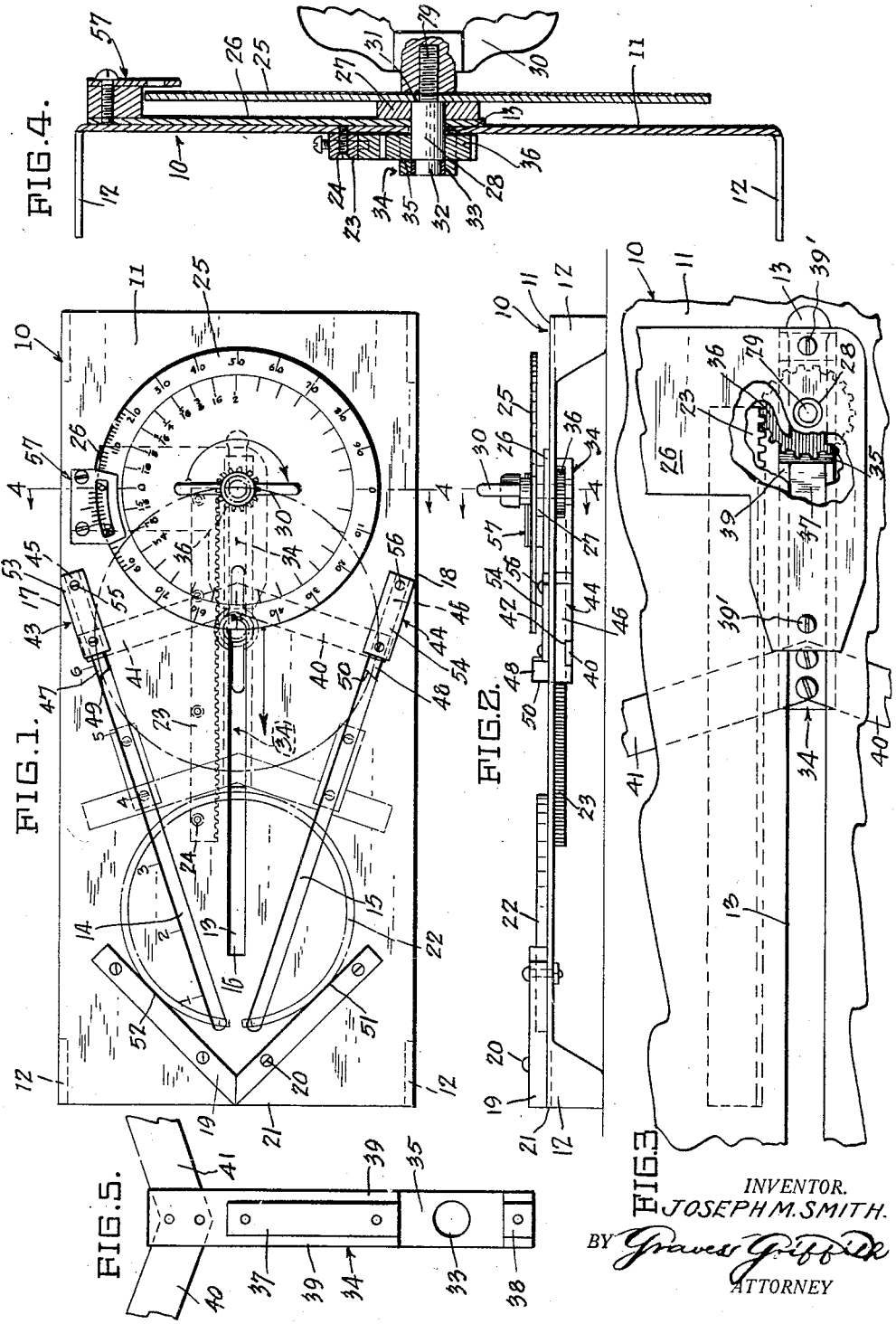
INVENTOR.
JOSEPH M. SMITH.
BY Graves Griffith
ATTORNEY Patented Oct. 29, 1929

1,733,320

UNITED STATES PATENT OFFICE

JOSEPH M. SMITH, OF SAN FRANCISCO, CALIFORNIA

DEVICE FOR DIMENSIONALLY GAUGING OBJECTS

Application filed June 2, 1928. Serial No. 282,493.

The present invention relates to improvements in measuring devices, and more particularly to those of micrometrical character adapted to the dimensional measurements of circular and rectangular bodies, and is especially adaptable for securing the speedy and exact measurements of piston rings and bodies of like construction.

The primary object of my invention is the provision of an instrument of precision of the character designated that is of simple and substantial construction, of ready manipulation, of utmost accuracy, and of a nature that is speedily adjustable to whatever and all measurements required to be made.

An additional object of my invention is to so improve instruments of precision of the character designated as to insure securing more accurately and speedily than is possible with present instruments the dimensional measurements of bodies falling within its range.

Referring particularly to Patent No. 1,648,497, issued November the 8th, 1927, by adding two diagonal slots to the base of said instrument for guiding two slidable members provided as a substitute for the movable gauge plate of said patent and providing means for their operation, the range of the said instrument is thereby doubled, its manipulation simplified, substitute gauge plates eliminated, calculation rendered unnecessary, accuracy increased, and time of operation shortened.

The slidable members mentioned are moved back and forth in their guide slots by an activating angular member rigidly fixed to the slidable carriage member on the underside of the gauge plate.

The angle of this activating member is of such degree as to compensate for the distance traveled by the slidable gauge members, relative to that of the carriage member, as the distance traveled along the diagonal slot-guides, per inch, measured between gauge faces, is greater than that of the carriage member.

The diagonal slots or guideways, the slidable members operating in the same, and the angular activating or compensating member accomplish all claimed advantages of and constitute my invention in improvements of measuring devices as hereinbefore referred to.

Other and supplementary objects to the preceding will appear as this specification progresses and be more fully brought out in the claim hereto appended and forming a part thereof.

In the accompanying drawings, forming a part of this specification and in which like reference characters refer to similar parts, throughout:

Figure 1 is a plan view of my improved micrometer, showing, in full lines, the various elements as in zero position, and, in dot-and-dash lines, the measuring elements as in operative position;

Figure 2 is a side elevation of the micrometer, showing the configuration of the supporting frame;

Figure 3 is an enlarged fragmentary plan view of a portion of the supporting plate, the dial carriage, and the dial actuating pinion;

Figure 4 is a transverse sectional detail taken through the frame, the actuating pinion and rack, and the dial carriage and the dial, as indicated by the line 4—4 in Figures 1 and 2; and Figure 5 is a plan detail view of the Y-shaped gauge-actuating bar.

Referring to the drawings with greater particularity and in detail, the numeral 10 indicates the base, or supporting, plate, preferably of rectangular form, comprising an upper face 11 supported by means of downwardly extending sections 12 constituting legs and forming an integral portion thereof. The base as thus constituted is centrally and longitudinally slotted, as indicated at 13, and angularly slotted, as indicated at 14 and 15, the latter slots being of V-formation and extending from a point adjacent the end 16 of the slot 13 in divergent directions to points adjacent the side edges 17 and 18, as shown in Figure 1.

A rigid right-angularly shaped gauge member 19 is mounted upon the base plate 10 by means of a plurality of screws 20 and positioned with its apex flush with the end edge 21 of this plate and is adapted to receive a piston or other ring 22 intended for measurement, as indicated in dotted lines in Figure 1.

Adjacent the slot 13 and extending parallel therewith and positioned against the underside of the base plate is a longitudinally disposed rack-bar 23 having a plurality of screws extending therethrough and into tapped openings formed therefor in the base plate, Figures 1 and 4.

The dial 25 is mounted for both rotary and longitudinal movement in the guide slot 13 and is carried by means of a dial carriage 26, which is of L-shape in plan, as shown in Figures 1 and 3, and is adapted for sliding contact upon the upper flat face 11 of the base plate 10, Figures 2 and 4.

The dial 25 is spaced from the carriage by means of a washer 27 and the dial, washer and carriage plate 26 are perforated to receive a stub-shaft 28 having a reduced threaded outer end 29 upon which a wing-nut 30 is screwed to clamp the dial tightly in place upon the shoulder 31 formed upon the stub-shaft for that purpose. The stub-shaft extends through the guide slot 13 in the base, with its lower end 32 seated in a bearing opening 33 formed in one end of the gauge-actuating bar 34, Figures 4 and 5, this bar being notched, as indicated at 35, to receive the actuating pinion 36, the pinion being rigidly carried by the stub-shaft 28 and free to rotate between the under face of the base plate and the actuating-bar 34, its rotation being accomplished through the manipulation of the wing-nut 30 and in direction as indicated by the curved arrow in Figure 1.

The actuating-bar 34 is provided with raised sections 37 and 38, Figure 5 forming a shoulder 39 which bears against the underside of the base plate on opposite sides of the guide slot 13, with sections 37 and 38 extending thereinto and forming a guide for the bar 34 in its sliding movement therein, the bar, itself, being held in close contact against the underside of the carriage plate 26 by means of a plurality of screws 39', Figure 3, the bar and carriage being both slidable as a unit in the guide slot 13 and adapted to carry with them the dial 25 and pinion 36, with the pinion teeth at all times in mesh with those of the rigidly mounted rack-bar 23.

The actuating-bar 34 is provided at its inner end with a pair of oppositely arranged and angularly extending arms 40 and 41, these being disposed at right angles to the slots 14 and 15 formed in the base, and, as they are moved toward the gauge member 19, maintain always this right angular relation, the free ends of the arms being adapted to engage in slots 42 formed in the under faces of the gauge members 43 and 44.

The gauge members 43 and 44 each comprise bars 45 and 46 adapted to form a sliding fit in the slots 14 and 15 and embody upwardly extending gauge lugs 47 and 48 having their front ring-contacting faces 49 and 50 arranged at right angles to the gauge faces 51 and 52, respectively, of the stationary gauge member 19, these bars being held in slidable engagement with the base plate by means of plates 53 and 54 held in rigid relation therewith by means of screws, or the like, 55 and 56, Figures 1 and 2.

The vernier 57 is rigidly mounted upon the outer end of the carriage 26 and embraces the peripheral edge of the dial 25, Figure 4, the dial face being provided with concentrically arranged rows of graduations adapted to register with similar graduations carried by the vernier.

In employing the micrometer for the measurement of piston rings and like objects, the ring or object, here shown as a piston ring, is placed upon the base plate 10 with its pheripheral edge contacting the right angular faces 51 and 52 of the rigid gauge member 19, and the wing-nut 30 manipulated in the direction indicated by the arrow in Figure 1, this rotary movement, in turn, being imparted to the stub-shaft 28 and pinion 36 causing the dial 25 to be rotated relative to the vernier 57 and through the contacting of the pinion teeth with the rack-bar 23, causing the longitudinal movement of the dial 25, the carriage plate 26 and the actuating bar 34 in the slot 13.

While the preceding actions are taking place, the arms 40 and 41 of the actuating-bar slide through the slots of the gauge members 43 and 44, causing their simultaneous forward movement in the slots 14 and 15 toward the gauge 19.

In measuring the split piston ring, the ring is placed between the faces 49 and 50 of the gauge members and compression brought to bear upon it until, through the actions of the movements previously described, its free ends are brought snugly together, as indicated in dot-and-dash position, when the reading for measurement is readily obtained by reference to the dial graduations, and the more delicate sub-divisions through the vernier attachment. For less exacting requirements in measurements, an auxiliary scale has been provided extending along the margin of the slot 14 and indicated by the numerals 1, 2, 3, 4, 5 and 6, the sub-divisions not being shown, the extreme edge of 49 serving as an index thereto.

After securing measurements, the movable measuring elements of the micrometer are returned to their normal or zero positions by a simple reversal of the movements employed in securing measurement, the act continuing until the correlated elements have been returned to the positions indicated in Figure 1.

As thus illustrated and described, I claim, and desire to secure by Letters Patent:

A device for gauging circular objects comprising a base plate, a guage member fixed thereto, there being a central slot in said plate extending toward said member, there also being a slot on each side of said central slot, each converging toward said slot toward said member, a carriage mounted for sliding in and along said central slot, a dial rotatably carried thereby, gauge members each slidable in and along its respective side slot, and means connecting said carriage, base plate and sliding gauge members whereby rotation of said dial causes simultaneous movement of said carriage and gauge members along their respective slots.

In testimony whereof I hereunto affix my signature.

JOSEPH M. SMITH.